Sept. 19, 1950 C. C. CRAVEN 2,522,749
SELF-ALIGNING HONE OR REAMER DRIVE
FOR FITTING PISTON PINS
Filed Dec. 23, 1946
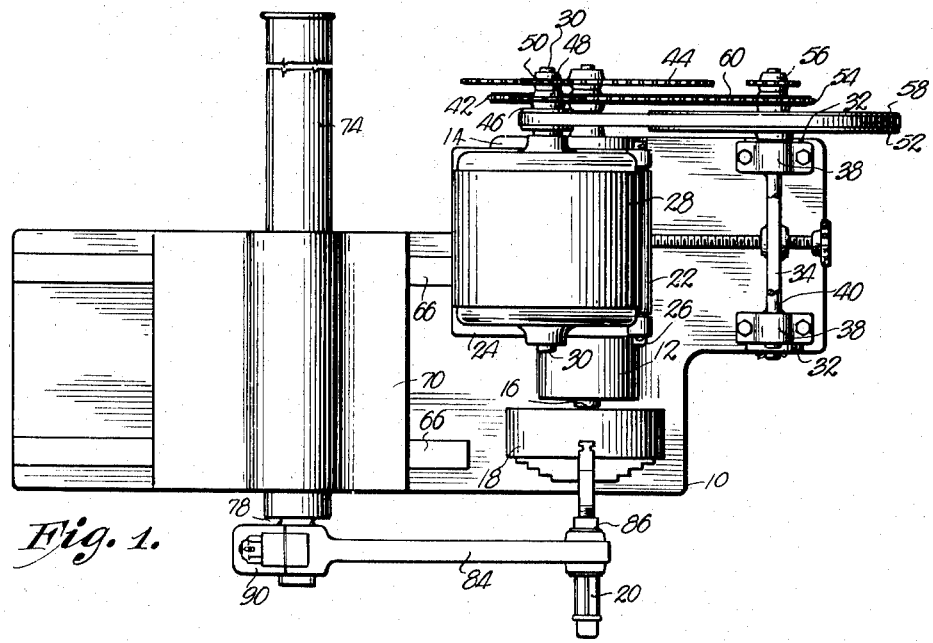
Fig. 1.
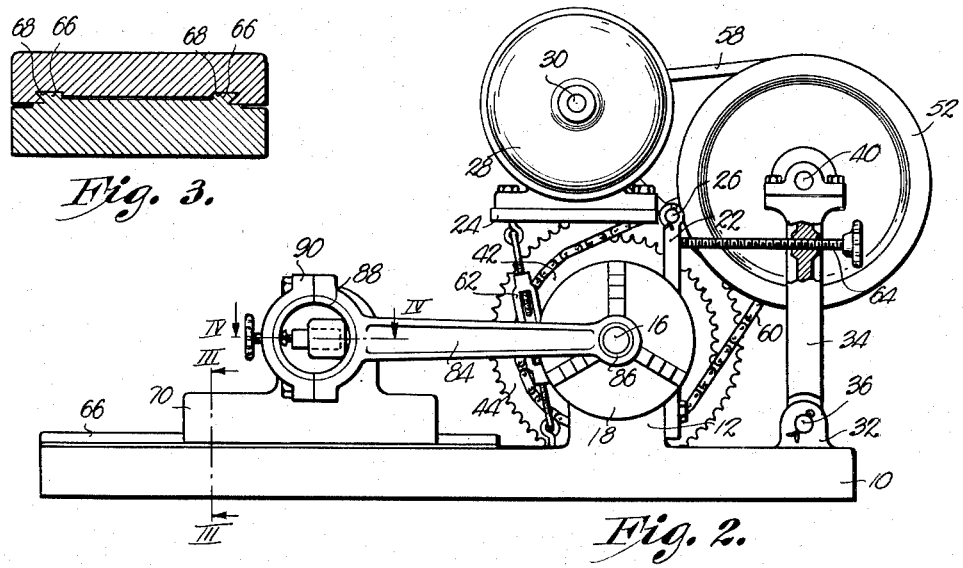
Fig. 3.
Fig. 2.
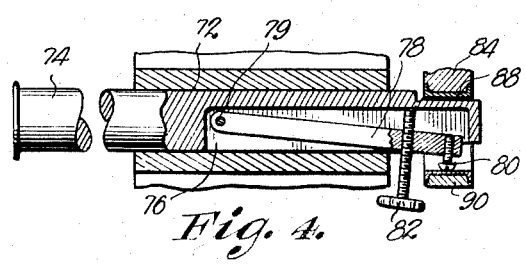
Fig. 4.
INVENTOR.
Claud C. Craven
BY
ATTORNEY.

Patented Sept. 19, 1950

2,522,749

UNITED STATES PATENT OFFICE 2,522,749

SELF-ALIGNING HONE OR REAMER DRIVE FOR FITTING PISTON PINS

Claud C. Craven, Kansas City, Mo.

Application December 23, 1946, Serial No. 718,002

1 Claim. (Cl. 77—3)

This invention relates to power driven tools and more specifically to apparatus for reaming cylindrical bores in members wherein it is desired to enlarge or shape said bores to a predetermined desired condition.

This invention has to do particularly with connecting rods for internal combustion engines or the like and has for its primary object the provision of means for fitting the piston pins into the cylindrical bushing forming a part thereof through use of a reamer drive having parts for definitely and precisely aligning the bore of said bushing with the reamer being used and as the same is caused to rotate about its longitudinal axis.

One of the most difficult problems in this field lies in the peculiar contour or irregular faces inherent in most internal combustion engine connecting rods, in that such irregular contour causes great difficulty in aligning the same on a reaming tool, to the end that the bushing being reamed will remain truly parallel to the bearing at the opposite end. In other words, a connecting rod has no definite measuring surface, against which a guide may bear to serve as a measuring or aligning medium when such connecting rod is to be held in operative relationship with a rotatable reaming tool, except the bearing at one end thereof.

It is the primary object of this invention, therefore, to provide a self aligning power driven reamer drive for fitting piston pins, which machine includes a rotatable reaming tool and structure operably associated therewith for holding one end of the connecting rod in a position where the end having the piston pin bushing therein may be received by the rotatable reaming tool.

A further object of this invention is to provide a reamer drive having structure which permits free manual movement of the connecting rod through a reciprocable path of travel upon the reaming tool and at the same time allows free movement of said connecting rod laterally in all directions in transverse relation to the axis of rotation of said reaming tool, throughout the time the entire machine is placed in operation and while the operator thereof is manipulating the connecting rod.

A still further object of this invention is to provide a machine for reaming piston pin bushings or the like having positive self aligning means which includes a longitudinally reciprocable, elongated rod or pin having means on one end thereof for clampingly holding the connecting rod in ninety degree relationship thereto.

Another object of this invention is to provide structure having a table for supporting the said pin, which table is slidably mounted for movement toward and from the reaming tool in transverse relation to the sliding reciprocable path of movement of the pin, all to the end that the connecting rod and the reaming tool associated operably therewith will be self aligned without additional effort on the part of the operator other than shifting the connecting rod longitudinally on the reaming tool in the conventional manner.

Additional objects of this invention include an unique assembly of reduction gearing, presenting a plurality of different driving speeds for the rotatable reaming tool; the way in which a quickly adjusted expander type of holding means forms a part of the above mentioned reciprocable rod for holding the larger babbitted bearing end of the connecting rod in place; and the manner in which all of the associated parts forming the holding means for the connecting rod maintain the same in a position where the respective axes of the said connecting bearing and the reaming tool are maintained in true and precisely aligned parallel relationship as the guiding operation takes place.

Referring now more specifically to the drawing:

Fig. 1 is a top plan view of a self aligning hone or reamer drive for fitting piston pins made in accordance with my present invention.

Fig. 2 is a side elevational view thereof.

Fig. 3 is a cross sectional view taken on line III—III of Fig. 2, looking in the direction of the arrows, and Fig. 4 is a fragmentary cross sectional view taken on line IV—IV of Fig. 2.

While the machine about to be described has been designed for use particularly as a means for finishing the piston pin bushing of connecting rods, it is contemplated that the same may well be used for reaming cylindrical bores in any member with perhaps only a slight alteration in some cases. It is well known in this art that connecting rods for internal combustion engines necessarily must be overhauled from time to time, particularly by reshaping and, therefore, enlarging the size of the bore forming the piston pin bushing, whereupon a new piston or "wrist" pin replaces the original pin.

In the drawing the number 10 designates broadly an elongated base for mounting and supporting all of the component parts of the machine, the uppermost face whereof near one one of its ends has an upturned extension 12, integral therewith and a bracket 14, each having suitable bearings therein for rotatably mounting a shaft 16 at one end whereof is secured a chuck 18. This chuck 18 may be of any of the usual types similar for instance to those used on lathes or the like, for holding a reaming tool 20.

It is to be understood that when the term "reaming tool" is used throughout this specification it is not desired to be limited to any precise form of such tool. The same may well comprise a reamer as at 20 having a number of longitudinal cutting blades thereon, or a hone for grinding the walls forming the bore to be reshaped, or any other type of refinishing tool.

An arm 22 extends upwardly from the extension 12 and has swingably secured at the uppermost end thereof a shelf 24 through the medium of a transverse pin 26 upon which shelf 24 electrical motor 28 is mounted. This motor 28 has connection with a suitable source of electrical energy (not shown) and is provided with a rotatable shaft 30 in the usual manner. A pair of spaced apart brackets 32 on the base 10 and extending upwardly therefrom near one end thereof outwardly from extension 12, pivotally mount an upwardly extending arm 34 by a transverse shaft 36 and this arm 34 carries a pair of bearings 38 at the uppermost free end thereof for rotatably supporting a shaft 40. One end of each of the shafts 16, 30 and 40 respectively carry a number of sheave and sprocket wheels, as is clear in Fig. 1, all to the end that the speed of rotation of the shaft 16 and, therefore, the reaming tool 20, may be selectively varied in accordance with the particular desires of the operator. It is understood that the diameters of these sprockets and sheaves may well be varied and the following sizes are, therefore, for illustrative purposes only.

Shaft 16 carries the chuck 18 and has a 6" sprocket 42 affixed thereon and an 8" sprocket 44 nearer the outwardly extending free end thereof. Shaft 30 of the motor 28 carries first a 1½" V pulley or sheave 46, a 2⅜" sprocket 48 and finally at the outermost end thereof a 1½" sprocket 50. Shaft 40 has mounted thereon near the proximal bearing 38 and 8" V type pulley 52, a 2⅜" sprocket 54 and an 1½" sprocket 56 at the outermost end thereof.

In the connection illustrated sheaves 46 and 52 of shafts 30 and 40 respectively are joined by a V belt or the like 58 and the sprockets 42 and 54 of shafts 16 and 40 respectively have a chain 60 passing therearound. It is readily seen that motor 28 driving its shaft 30 will in turn drive the idler shaft 40 and the shaft 16 carrying chuck 18 will in turn be driven through the medium of chain 60.

Other combinations different from that just described are as follows: The belt 58 passes around sheaves 46 and 52 in the same manner as above described and the chain 60 moved to pass around sprockets 44 and 56 of shafts 16 and 40 respectively. Two other combinations operate by removing the belt 58 entirely and rendering the shaft 40 and its sheave and sprockets inoperable. One of these combinations consist of passing chain 60 around sprockets 48 and 42 of shafts 30 and 16 respectively and the other by passing the chain 60 around sprockets 50 and 44 of shafts 30 and 16 respectively. In these latter two instances the shaft 16 is driven directly from shaft 30 of motor 28. It is readily seen that these four combinations drive the reaming tool 20 at a like number of different speeds, assuming that shaft 30 of motor 28 rotates at a given speed.

The table 24 supporting the motor 28 has the end thereof remote from its pivotal connection 26 held in the upright position illustrated in Fig. 2 by a turnbuckle 62 and an elongated screw 64 in threaded engagement with an opening formed in the arm 34 has one end thereof bearing against the upright arm 22; tightening or loosening of the chain 60 and/or the belt 58 may be accomplished by adjusting either the turnbuckle 62 or the screw 64 or both as desired.

The uppermost face of base 10 at one end thereof opposite to the brackets 32, has a pair of substantially parallel longitudinally disposed and upwardly extending guides 66 formed therein which slidably receive a pair of spaced apart grooves 68 formed in the lowermost face of a reciprocable table 70. These guides and corresponding grooves 68 respectively are substantially triangular shaped in the usual manner for providing a way for movement of table 70 toward and from the reaming tool 20 and through a path of travel perpendicular to the axis of rotation of said reaming tool 20. This table 70 has formed therein in transverse relation and perpendicular to the grooves 68 therein a bore 72 for slidably and rotatably receiving a cylindrical rod or pin 74. One end of this pin 74 proximal to the reaming tool 20 has a cavity 76 extending thereinto and terminating inwardly from said end thereof. This cavity 72 constitutes a slot for receiving an arm 78 having one end thereof pivotally secured to the rod 74 by a transverse pin 79 near the innermost end of the cavity 76. This arm 78 extends the entire length of cavity 76 and has a set screw 80 threadingly affixed therein and at its free end. Longer operating screw 82, spaced inwardly from the set screw, extends entirely through arm 78 and is in threaded engagement therewith. Although this slidable rod 74 is cylindrical throughout the greater portion of its length, the end thereof having cavity 76 therein is reduced to a square cross sectional contour, as is clearly shown in Fig. 2. The operation of the above described machine is clear from the foregoing and it is easily seen how connecting rod 84 is held in place for finishing the bushing 86 formed in one end thereof. As is well known, in addition to the bushing 86 fitted into a bore formed in one end of connecting rod 84, this part of an internal combustion engine has on the opposite end thereof a babbitted bearing 88 including a bearing cap 90. When this connecting rod 84 was initially formed and manufactured, the axes of bushing 86 and the bearing 88 were parallel and it is this factor which is utilized to attain the objects set down above. Connecting rod 84 is first placed into position by slipping the bearing 88 over the reduced square end of rod 74, whereupon the operating screw 82 is moved against inner wall of cavity 76 until outermost end of set screw 80 bears directly against the inner face of bearing 88. It is observed at this point that set screw 80 may be adjusted to the end that this entire expanding type of holding means including arm 78 will accommodate different sizes of bearings 88. When connecting rod 84 is so mounted upon the rod 74, the same is substantially perpendicular to rod 74 and to the path of travel of the table 70. This is because of the parallel relation between the longitudinal axis of rod 74 and the axis of rotation of reaming tool 20. The operator then merely grasps connecting rod 84 and moves the same to the position where reaming tool 20 is within the bushing 86 and during operation the same may be reciprocated along the longitudinal axis of reaming tool 20 in the usual manner until bushing 86 is shaped to the desired condition.

It is notable that during this operation connecting rod 84 is free to move transversely with respect to reaming tool 20 due to the free slidable movement of table 70 upon base 10 and is also free to swing vertically because of the rotatable mounting of rod 74 within the bore 72. It is this floating action in vertical and horizontal planes with relation to the axis of the refinishing tool which insures the self-aligning of the bore of the bushing 86 in parallelism with the bore of the bearing 88. In other words, as the refinishing tool tends to straighten out a hole which does not parallel the axis of the bearing 88, reciprocation of the table 70 and oscillation of the supporting rod 74, permit a shifting in position of the connecting rod 84 to insure that the axis of the hole being refinished in the bushing 86 will be parallel to the axis of the bearing 88.

It is also notable that movement of table 70 permits different lengths of connecting rods to be finished; that connecting rod 84 is free to be swung in any vertical position desired while the operator moves bushing 86 from reaming tool 20; and that in addition to the entire machine accommodating a conventional reamer 20 having a number of cutting blades thereon, as clearly illustrated in Fig. 1, a hone may be secured in chuck 18 for final finishing.

This feature of being adaptable for accommodating either a reamer or a hone is extremely advantageous in the machine just described. Most devices of this character on the market today either employ only a hone or a reamer and these tools are either not interchangeable at all or necessitate complicated substitution and change of parts to render the same interchangeable. Furthermore, as far as I am aware, there is no machine of this character in which the end of the connecting rod being finished is supported in such a manner that the axis of its bore is in floating relation to the axis of the refinishing tool without imposing a load on the tool greater than that of the weight of the end of the connecting rod, and regardless of the length of such connecting rod. This result is secured by the back and forth or rectilinear adjustment of the table at 90° to a plane passing through the axis of the refinishing tool and by the additional fact that the crank shaft end of the rod is mounted for oscillation around an axis substantially coaxial with its bore.

The drive illustrated and described herein is capable of rotating the shaft 16 at different rates of speed. When maximum speed is utilized, the hone type tool is employed and when the speed is reduced, a tool of the reamer type is mounted on shaft 16.

Change-over from one speed to another is possible through employment of the parts shown.

Manifestly, many modifications may be made to the preferred form herein shown and described without departing from the spirit of the invention or scope of the appended claim.

Having thus described the invention, what is claimed as new and desired to be secured by Letters Patent is:

A machine for refinishing connecting rod bores comprising a base, a rotatably driven tool journaled on the base, a pair of guides formed on the base and extending at right angles to the plane of the longitudinal axis of the driven tool, a table freely reciprocable on said guides and having a bore paralleling the longitudinal axis of the driven tool, a rod rotatable and longitudinally slidable in said bore and having a cavity at one end and exteriorly formed with a two-point bearing contact, an arm pivoted at one end within the cavity and formed with a third bearing contact at its other end in opposition to the two-point contact, and a set screw in threaded engagement with the arm and abutting the rod for adjustably spacing the third bearing contact in relation to the two-point bearing contact.

CLAUD C. CRAVEN.

REFERENCES CITED

The following references are of record in the file of this patent:

UNITED STATES PATENTS

| Number | Name | Date |
|---|---|---|
| 1,603,070 | Cox et al. | Oct. 12, 1926 |
| 1,921,316 | Mattern et al. | Aug. 8, 1933 |
| 2,218,380 | Evans | Oct. 15, 1940 |
| 2,414,731 | Forbes | Jan. 21, 1947 |